United States Patent
Kim (10) Patent No.: US 8,761,937 B2
(45) Date of Patent: Jun. 24, 2014

(54) WALKING ROBOT AND CONTROL METHOD THEREOF

(75) Inventor: Jong Owan Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 272 days.

(21) Appl. No.: 13/327,862

(22) Filed: Dec. 16, 2011

(65) Prior Publication Data

US 2012/0165980 A1    Jun. 28, 2012

(30) Foreign Application Priority Data

Dec. 28, 2010   (KR) .................. 10-2010-0136705

(51) Int. Cl.
*G05B 19/00*    (2006.01)

(52) U.S. Cl.
USPC .......................... 700/254; 717/171

(58) Field of Classification Search
USPC .............. 700/2–3, 44, 245, 248, 250, 254; 717/171, 176; 318/53, 548, 85, 400.01
See application file for complete search history.

(56) References Cited

U.S. PATENT DOCUMENTS 4,803,613 A *  2/1989  Kametani et al. .................. 700/3
7,432,674 B2 * 10/2008  Aoyama et al. .................. 318/85

FOREIGN PATENT DOCUMENTS

JP    2010-504011    2/2010
JP    2010-206471    9/2010

* cited by examiner

*Primary Examiner* — Dalena Tran
(74) *Attorney, Agent, or Firm* — Staas & Halsey LLP (57) ABSTRACT

A walking robot and a control method thereof. The walking robot includes a main communication path, a subsidiary communication path, at least one master generating a communication protocol and transmitting the communication protocol through the main and subsidiary communication paths, and a plurality of slaves communicably connected to the at least one master through the main and subsidiary communication paths, increasing a value of an access counter of the communication protocol received through the main communication path, decreasing a value of the access counter of the communication protocol received through the subsidiary communication path, and forming loop-back paths connecting the main communication path and the subsidiary communication path when a communication error has occurred, wherein the at least one master judges whether or not the communication error has occurred from the values of the access counter of the communication protocol having passed through the plurality of slaves.

16 Claims, 7 Drawing Sheets

WALKING ROBOT AND CONTROL METHOD THEREOF

CROSS-REFERENCE TO RELATED APPLICATIONS

This application claims the benefit of Korean Patent Application No. 2010-0136705, filed on Dec. 28, 2010 in the Korean Intellectual Property Office, the disclosure of which is incorporated herein by reference.

BACKGROUND

1. Field

Embodiments relate to a walking robot having a large number of joints.

2. Description of the Related Art

In a robot having mobility, communication between respective joints may be cut by reduction of lift spans of communication lines due to motions of the robot, and in the extreme case, by defects of the communication lines or damage to connector portions between the communication lines and a circuit board. Further, as the volume of control data to be controlled is increased, shafts (slaves) to be controlled are increased and a control cycle is reduced to the unit of milliseconds or less, a physical layer of a communication network is changed to a ring structure in a point-to-point manner due to velocity increase. Under such circumstances, if errors of communication lines between respective devices (i.e., between a master and a slave and between a slave and another slave) occur, there is conventionally no communication means communicating with an end under the error occurrence end. Therefore, in case of a humanoid robot, a measure to stably stop the robot when a communication error has occurred during walking is required.

SUMMARY

Therefore, it is an aspect of an embodiment to provide a walking robot which detects a communication error and generates an alarm when the communication error has occurred, and a control method thereof.

Additional aspects of embodiments will be set forth in part in the description which follows and, in part, will be obvious from the description, or may be learned by practice of embodiments.

In accordance with an aspect of an embodiment, a walking robot includes a ring-structured main communication path, a ring-structured subsidiary communication path, at least one master generating a communication protocol having an access counter and transmitting the communication protocol through the main communication path and the subsidiary communication path, and a plurality of slaves communicably connected to the at least one master through the main communication path and the subsidiary communication path, increasing a value of the access counter of the communication protocol received through the main communication path, decreasing a value of the access counter of the communication protocol received through the subsidiary communication path, and forming loop-back paths connecting the main communication path and the subsidiary communication path when a communication error has occurred, wherein the at least one master judges whether or not the communication error has occurred on the main communication path and the subsidiary communication path from the values of the access counter of the communication protocol having passed through the plurality of slaves.

The at least one master may be a central computer of the walking robot, and the plurality of slaves may be a plurality of motor controllers of parts of the walking robot.

The communication protocol may include a header representing a type of an address or a packet, a datagram which is data to be transmitted to the at least one master or the plurality of slaves, and a checksum to confirm whether or not the communication error has occurred.

The communication direction of the main communication path and the communication direction of the subsidiary communication path may be opposite to each other.

The at least one master may generate an alarm upon judging that the communication error has occurred.

The communication error may include a multiple communication path error or a single communication path error.

In accordance with another aspect of an embodiment, a control method of a walking robot which has a ring-structured main communication path, a ring-structured subsidiary communication path, at least one master generating a communication protocol having an access counter and transmitting the communication protocol through the main communication path and the subsidiary communication path, and a plurality of slaves communicably connected to the at least one master through the main communication path and the subsidiary communication path, includes the plurality of slaves forming loop-back paths connecting the main communication path and the subsidiary communication path when a communication error has occurred, the plurality of slaves increasing a value of the access counter of the communication protocol received through the main communication path and decreasing a value of the access counter of the communication protocol received through the subsidiary communication path, and the at least one master judging whether or not the communication error has occurred on the main communication path and the subsidiary communication path from the values of the access counter of the communication protocol having passed through the plurality of slaves.

The communication error may include a multiple communication path error or a single communication path error.

It may be judged that the multiple communication path error has occurred, if the sum of the value of the access counter of the communication protocol received through the main communication path and the value of the access counter of the communication protocol received through the subsidiary communication path does not coincide with the number of the plurality of slaves.

It may be judged that the single communication path error has occurred, if the sum of the value of the access counter of the communication protocol received through the main communication path and the value of the access counter of the communication protocol received through the subsidiary communication path coincides with the number of the plurality of slaves.

The control method may further include generating an alarm, if the multiple communication path error or the single communication path error has occurred.

The at least one master may be a central computer of the walking robot, and the plurality of slaves may be a plurality of motor controllers of parts of the walking robot.

The communication protocol may include a header representing a type of an address or a packet, a datagram which is data to be transmitted to the at least one master or the plurality of slaves, and a checksum to confirm whether or not the communication error has occurred.

The communication direction of the main communication path and the communication direction of the subsidiary communication path may be opposite to each other.

The control method may further include the at least one master generating an alarm upon judging that the communication error has occurred.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
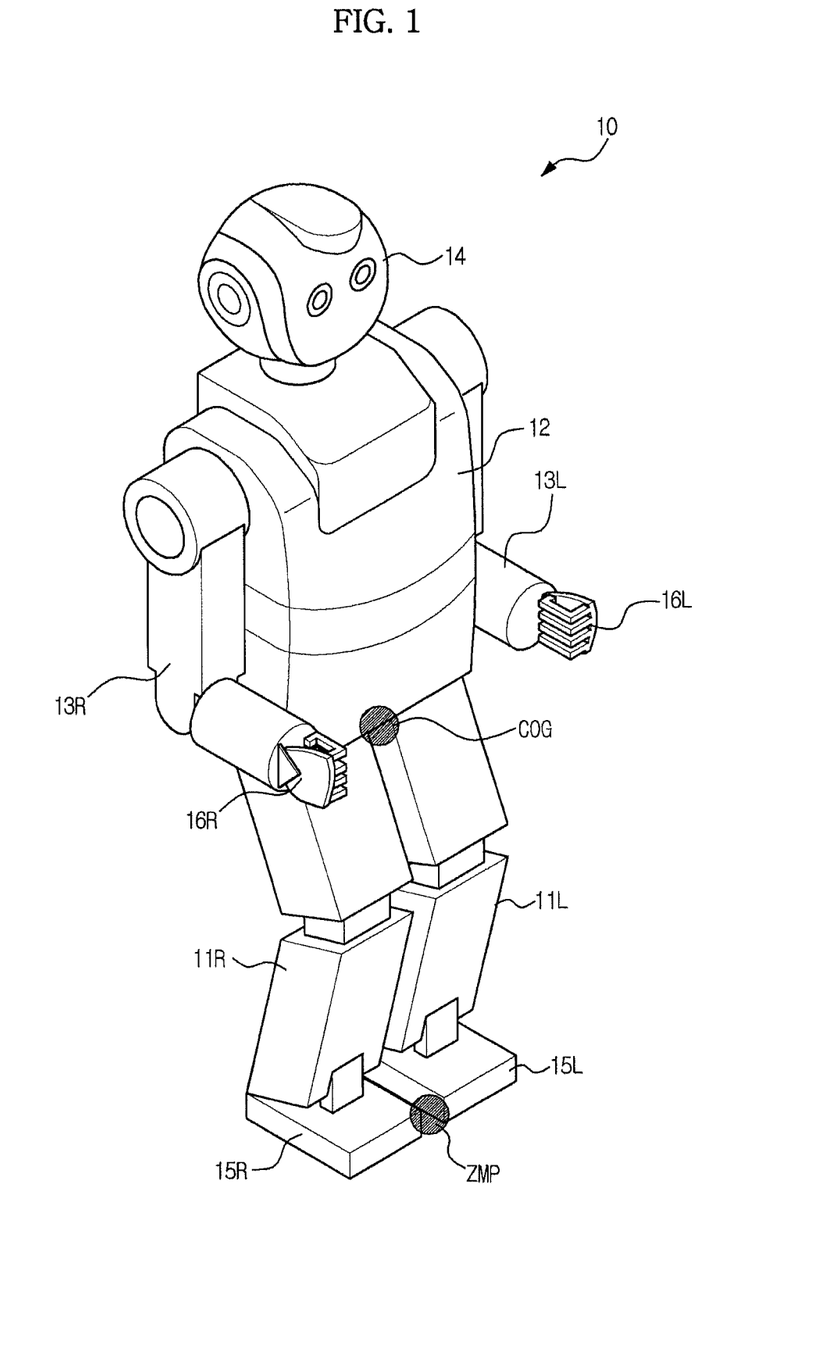
FIG. 1 is a view illustrating the external appearance of a legged walking robot in accordance with an embodiment.

FIG. 1 is a view illustrating the external appearance of a walking robot in accordance with an embodiment. As shown in FIG. 1, a robot 100 is a bipedal walking robot which moves erect in the same manner as a human, and includes a torso 12, two arms 13R and 13L and a head 14 provided at the upper portion of the torso 12, two legs 11R and 11L, feet 15R and 15L provided at the front ends of the legs 11R and 11L and hands 16R and 16L provided at the front ends of the arms 13R and 13L. Here, R and L respectively indicate the right and left sides of the robot 10, COG indicates the position of the center of gravity of the robot 10, and ZMP indicates a point where the sum of moment in the roll direction (in the x axis direction, i.e., the proceeding direction of the robot), moment in the pitch direction (in the y axis direction, i.e., the direction of a step width) on the contact plane between the robot 10 and the ground becomes 0.

Figure 2:
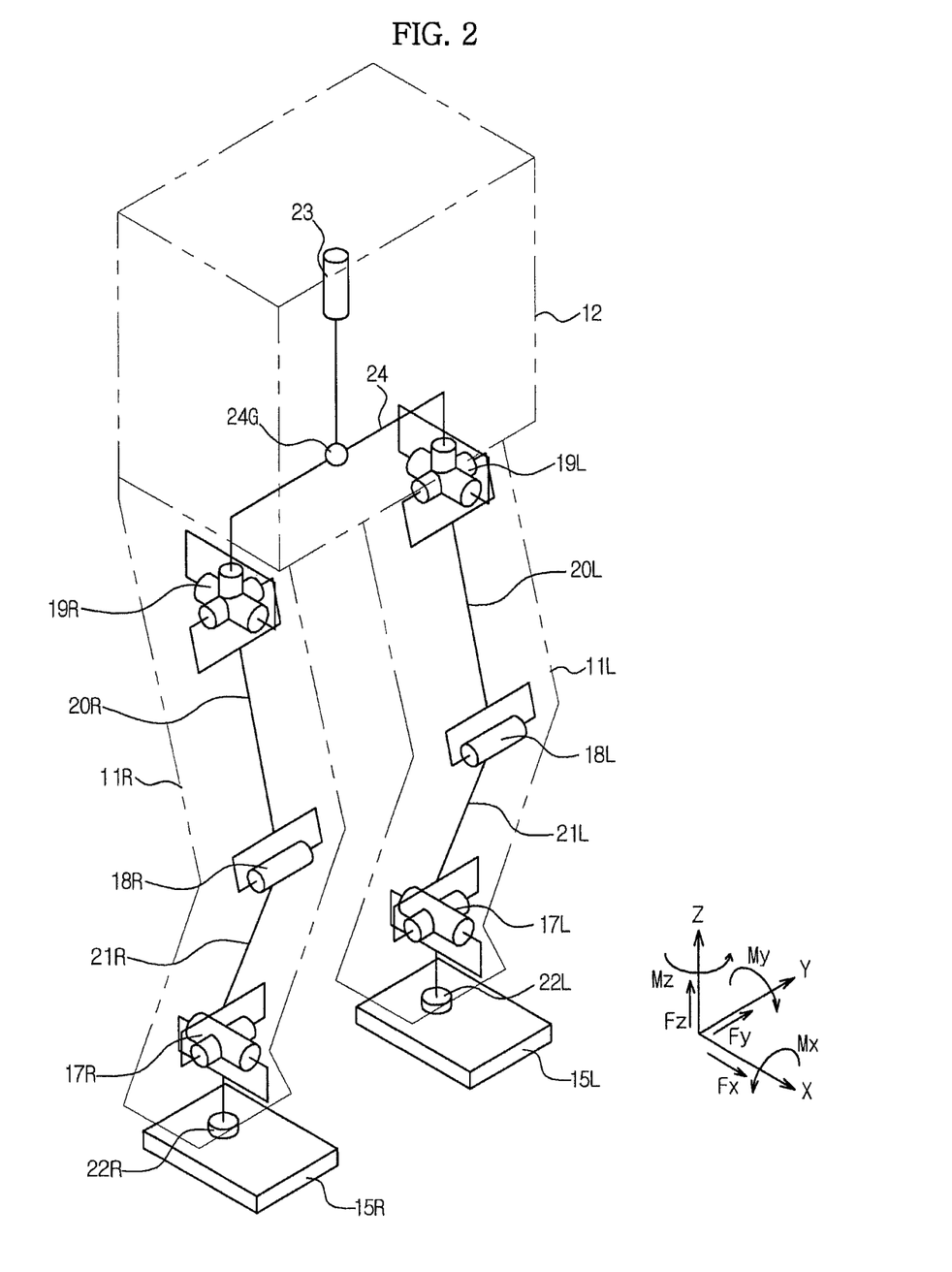
FIG. 2 is a view illustrating main joint structures of the legged walking robot shown in FIG. 1.

FIG. 2 is a view illustrating main joint structures of the walking robot shown in FIG. 1. As shown in FIG. 2, the two legs 11R and 11L respectively include ankle joints 17R and 17L, knee joints 18R and 18L, and hip joints 19R and 19L to rotate parts of the robot 10 corresponding to ankles, knees and hips, and the hip joints 19R and 19L are located at ends of both sides of the lower portion of the torso 12 connected to the two legs 11R and 11L.

The ankle joints 17R and 17L of the respective legs 11R and 11L are movable in the x axis direction (in the roll direction, i.e., the proceeding direction of the robot) and in the y axis direction (in the pitch direction, i.e., the direction of the step width), the knee joints 18R and 18L of the respective legs 11R and 11L are movable in the y axis direction (in the pitch direction), and the hip joints 19R and 19L of the respective legs 11R and 11L are movable in the x axis direction (in the roll direction), in the y axis direction (in the pitch direction) and in the z axis direction (in the yaw direction).

The two legs 11R and 11L further include upper links 20R and 20L connecting the hip joints 19R and 19L and the knee joints 18R and 18L and lower links 21R and 21L connecting the knee joints 18R and 18L and the ankle joints 17R and 17L, and enable the robot 10 to walk with designated levels of degree according to movement of the joints 17R, 17L, 18R, 18L, 19R and 19L. Force/torque sensors (hereinafter, referred to as F/T sensors) 22R and 22L are installed at ankles of the respective legs 11R and 11L, measure three-directional components Fx, Fy and Fz of forces and three-directional components Mx, My and Mz of moments transmitted from the feet 15R and 15L, and provide ZMP information.

The torso 12 connected to the two legs 11R and 11L includes a waist joint 23 to rotate a part of the robot 10 corresponding to a waist, and the waist joint 23 is collinear with a central position 24G of a hip link 24 connecting the hip joints 19R and 19L located at the ends of both sides of the lower portion of the torso 12. Although not shown in the drawings, all the joints 17R, 17L, 18R, 18L, 19R, 19L and 23 respectively include actuators (for example, electric devices, such as motors) to drive the joints 17R, 17L, 18R, 18L, 19R, 19L and 23.

Figure 3:
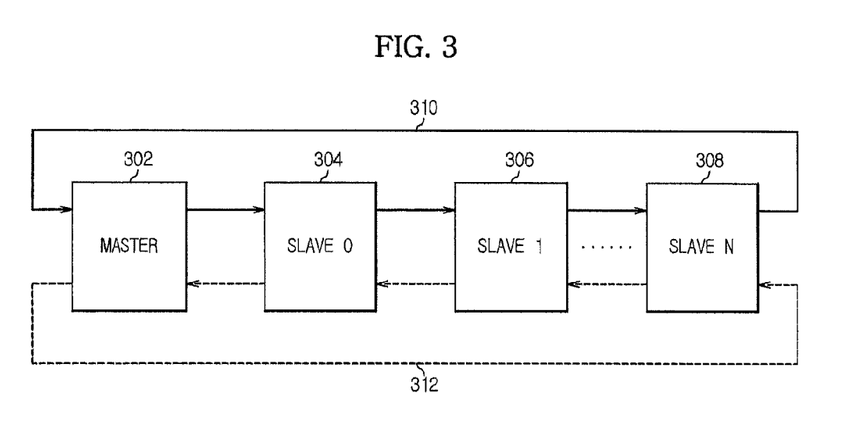
FIG. 3 is a view illustrating a master-slave ring-structured field bus of the walking robot shown in FIGS. 1 and 2.

FIG. 3 is a view illustrating a master-slave ring-structured field bus of the walking robot shown in FIGS. 1 and 2. In FIG. 3, a master 302 corresponds to a central computer of the walking robot 10, and slaves 304-308 correspond to motor controllers of respective parts of the walking robot 10. The master 302 corresponding to the central computer relates to the overall operation of the walking robot 10, such as generation of a motion profile, and the slaves 304-308 corresponding to the motor controllers receive a control command based on the motion profile generated by the master 302 and drive motors of the respective parts to operate actuators. The master 302 and the slaves 304-308 are connected to each other through a ring-structured main communication path 310, thus communicating with each other. The master 302 executes distributed control in which the control command is provided to the respective slaves 304-308 through the field bus (communication network). The master-slave ring-structured field bus of the walking robot 10 shown in FIG. 3 includes, in addition to the above-described main communication network 310, another ring-structured physical layer, such as a subsidiary communication path 312. While communication is carried out in the clockwise direction in the drawings through the main communication path 310, communication is carried out in the counterclockwise direction in the drawings through the subsidiary communication path 312. The subsidiary communication path 312 takes part in communication of the walking robot 10 together with the main communication path 310, and is used, when a communication error has occurred, to detect a kind of the error (a single path error or a multiple path error) and to take a necessary measure according to the detected kind of the error. In the master-slave ring-structured field bus of the walking robot 10 shown in FIG. 3, if no communication error has occurred, the master 302 transmits and receives a communication protocol through the main communication path 310 and the subsidiary communication path 312, respectively. The respective slaves 304-308 increase a value of an access counter (AC) by 1 whenever the respective slaves 304-308 receive the protocol through the main communication path 310 in the clockwise direction, and decrease a value of the access counter (AC) by 1 whenever the respective slaves 304-308 receive the protocol through the subsidiary communication path 312 in the counterclockwise direction. Therefore, the value of the access counter (AC) of the protocol received through the main communication path 310 becomes n (if the total number of the slaves 304-308 is n, and the value of the access counter (AC) of the protocol received through the subsidiary communication path 312 becomes 0.

Figure 4:
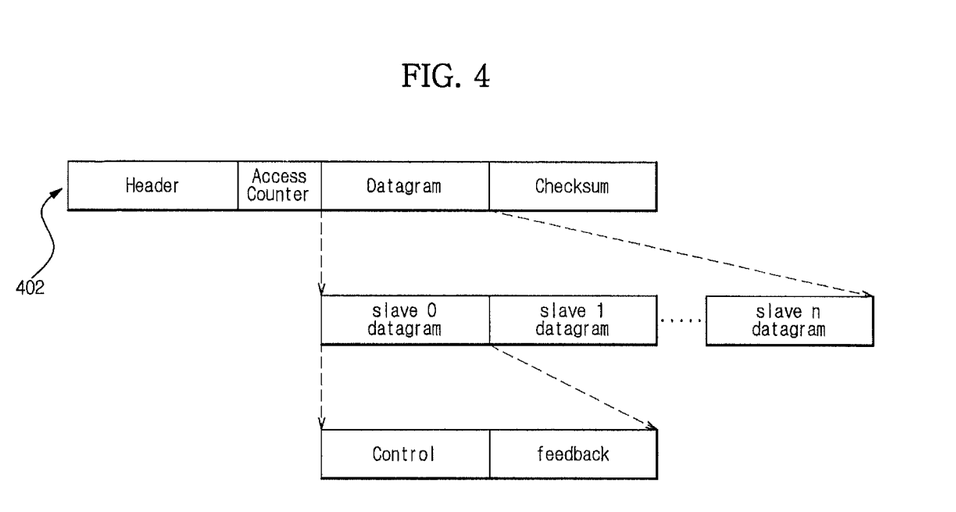
FIG. 4 is a view illustrating a communication protocol of the master-slave ring-structured field bus shown in FIG. 3.

FIG. 4 is a view illustrating the communication protocol of the master-slave ring-structured field bus shown in FIG. 3. As shown in FIG. 4, the communication protocol 402 includes a header, an access counter (hereinafter, referred to as AC, AC_N or AC_P), a datagram, a checksum, etc. The header represents a type of each address or packet. The access counter (AC) is used to confirm connection of the respective slaves 304-308 to communication, and the respective slaves 304-308 increase the value of the access counter (AC) by 1 whenever the respective slaves 304-308 receive the communication protocol 402. Such an access counter (AC) has the size of 1 byte, and the size of the access counter (AC) may be increased or decreased, as needed. The datagram is data to be transmitted to the master 302 or the slaves 304-308 through the communication protocol 402. Such a datagram is divided into datagrams corresponding to the respective slaves 304-308. Particularly, each of the datagrams corresponding to the respective slaves 304-308 is divided into control data for control and feedback data, such as a value detected by a sensor. The checksum is used to confirm whether or not an error of the communication protocol 402 has occurred so as to assure data integrity.

Figure 5:
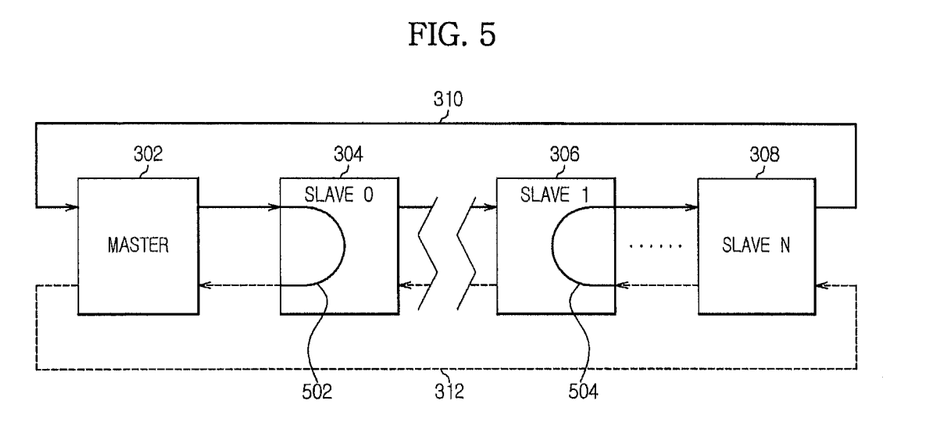
FIG. 5 is a view illustrating a field bus reorganized structure to overcome a communication error in the master-slave ring-structured field bus shown in FIG. 3.

FIG. 5 is a view illustrating a field bus reorganized structure to overcome a communication error in the master-slave ring-structured field bus shown in FIG. 3. As shown in FIG. 5, the master-slave ring-structured field bus is in a state in which a communication error between the slave 0 304 and the slave 1 306 has occurred and thus communication is not achieved. Here, the slave 0 304 forms a loop-back path 502, thus connecting the main communication path 310 and the subsidiary communication path 312. Further, the slave 1 306 forms a loop-back path 504, thus connecting the main communication path 310 and the subsidiary communication path 312. That is, the main communication path 310 and the subsidiary communication path 312 form one communication loop through the loop-back path 502 formed by the slave 0 304 and the loop-back path 504 formed by the slave 1 306.

Figure 6:
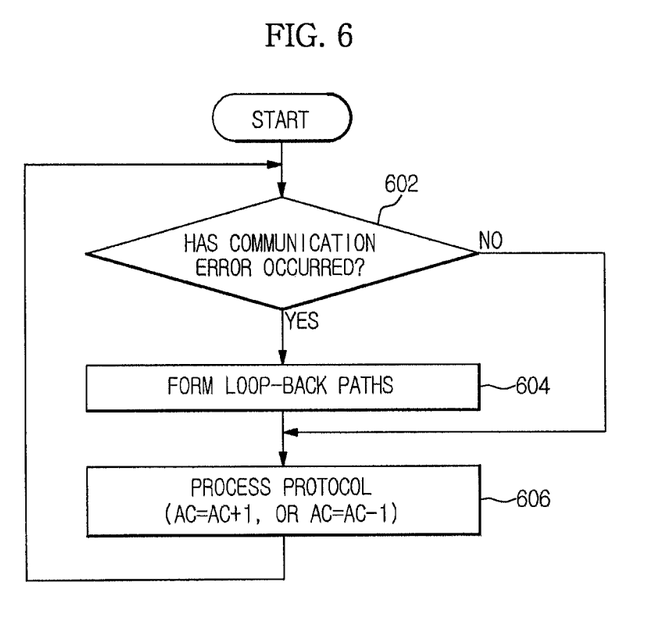
FIG. 6 is a flowchart illustrating a communication control method of slaves in the master-slave ring-structured field bus shown in FIG. 5.

FIG. 6 is a flowchart illustrating a communication control method of the slaves in the master-slave ring-structured field bus shown in FIG. 5. As shown in FIG. 6, the respective slaves 304-308 monitor whether or not a communication error has occurred (through presence or absence of a link signal, in case of Ethernet) (Operation 602). Upon judging that a communication error has occurred (yes in Operation 602), the corresponding slaves form loop-back paths to reorganize a communication path (Operation 604) (with reference to FIG. 5). When a communication protocol is received through one of a communication path reorganized due to the communication error and a normal communication path, the value of the access counter (AC) of the received communication protocol is increased or decreased by 1 (Operation 606). The value of the access counter (AC) of the communication protocol received through the main communication path 310 is increased by 1, and the value of the access counter (AC) of the communication protocol received through the subsidiary communication path 312 is decreased by 1.

Figure 7:
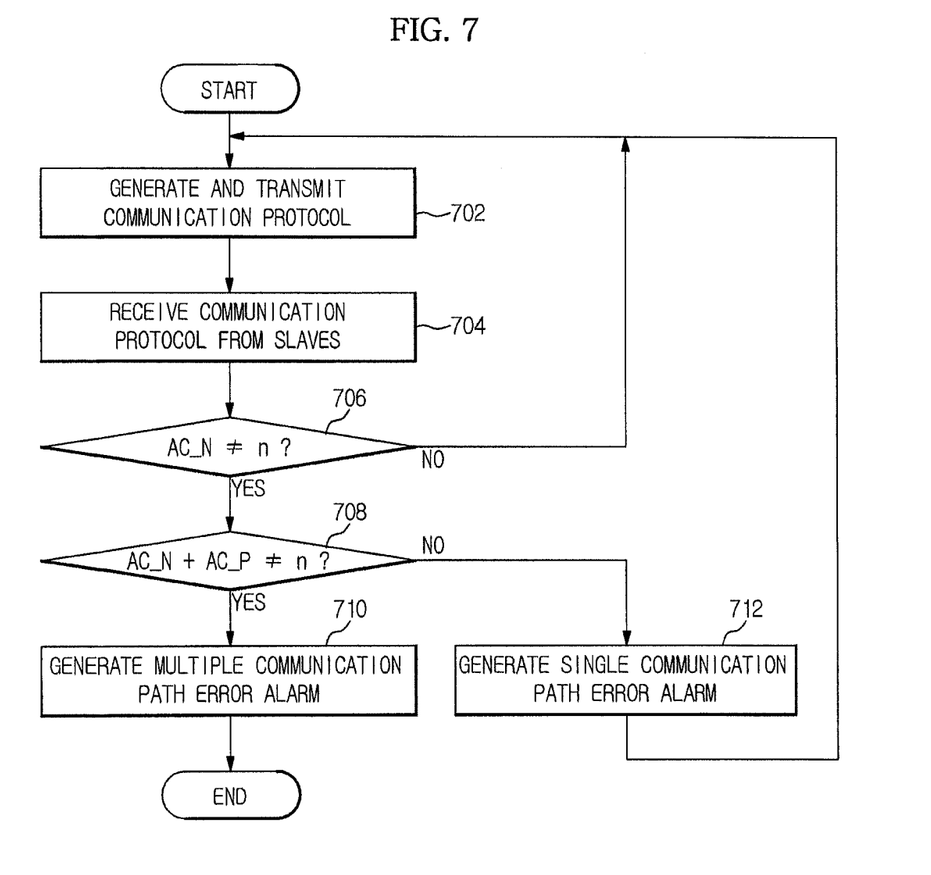
FIG. 7 is a flowchart illustrating a communication control method of a master in the master-slave ring-structured field bus shown in FIG. 5.

FIG. 7 is a flowchart illustrating a communication control method of the master in the master-slave ring-structured field bus shown in FIG. 5. As shown in FIG. 7, the master 302 generates a new communication protocol and transmits the communication protocol through the main communication path 310 and the subsidiary communication path 312, respectively (Operation 702). Further, the master 302 receives the communication protocol having passed through the respective slaves 304-308 through the main communication path 310 and the subsidiary communication path 312 (Operation 704). The master 302 having received the communication protocol from the slaves 304-308 compares the value of the access counter (AC_N) of the communication protocol received through the main communication path 310 with the total number (n) of the slaves 304-308 (Operation 706). If the value of the access counter (AC_N) of the communication protocol received through the main communication path 310 is n (no in Operation 706), the master 302 judges that no communication error has occurred, and thus generates and transmits a new normal communication protocol. On the other hand, if the value of the access counter (AC_N) of the communication protocol received through the main communication path 310 is not n (yes in Operation 706), the master 302 judges that a communication error has occurred. That is, the fact that the value of the access counter (AC_N) of the communication protocol received through the main communication path 310 is not n means that the communication protocol does not pass through all the slaves 304-308 due to the communication error, and thus it is judged that the communication error has occurred.

If it is judged that the communication error has occurred, the master 302 compares the sum of the value of the access counter (AC_N) of the communication protocol received through the main communication path 310 and the value of the access counter (AC_P) of the communication protocol received through the subsidiary communication path 312 with the total number (n) of the slaves 304-308 so as to check the type of the communication error (Operation 708). If the sum of the value of the access counter (AC_N) of the communication protocol received through the main communication path 310 and the value of the access counter (AC_P) of the communication protocol received through the subsidiary communication path 312 is not n (yes in Operation 708), the master 302 judges that a multiple communication path error has occurred and generates an alarm (Operation 710). That is, the master 302 judges that the communication error has occurred at two points or more in the master-slave ring-structured field bus or the slaves 304-308 are out of order, and generates an alarm of a proper level (for example, an alarm from an upper layer). On the other hand, if the sum of the value of the access counter (AC_N) of the communication protocol received through the main communication path 310 and the value of the access counter (AC_P) of the communication protocol received through the subsidiary communication path 312 is n (no in Operation 708), the master 302 judges that a single communication path error has occurred and generates an alarm (Operation 712). Stable parking of the robot 10 or repair or replacement of the point on the communication path where it is judged that the communication error has occurred is carried out based on the alarm.

As is apparent from the above description, a walking robot and a control method thereof in accordance with an embodiment detect a communication error and generate an alarm when the communication error has occurred, thereby securing safety.

The embodiments can be implemented in computing hardware and/or software, such as (in a non-limiting example) any computer that can store, retrieve, process and/or output data and/or communicate with other computers. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Embodiments are directed to a walking robot. However, embodiments are not limited to use with a "walking" robot. For example, embodiments are applicable to robots which do not walk. Moreover, embodiments are not limited to a robot, and can be applied to other apparatuses.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A walking robot comprising:
    a ring-structured main communication path;
    a ring-structured subsidiary communication path;
    a master of the walking robot generating a communication protocol having an access counter and transmitting the communication protocol through the main communication path and the subsidiary communication path; and
    a plurality of slaves of the walking robot communicably connected to the master through the main communication path and the subsidiary communication path, increasing a value of the access counter of the communication protocol received through the main communication path, decreasing a value of the access counter of the communication protocol received through the subsidiary communication path, and forming loop-back paths connecting the main communication path and the subsidiary communication path when a communication error has occurred,
    wherein the master judges whether or not the communication error has occurred on the main communication path and the subsidiary communication path from the values of the access counter of the communication protocol having passed through the plurality of slaves.

2. The walking robot according to claim 1, wherein:
    the master is a central computer of the walking robot; and
    the plurality of slaves is a plurality of motor controllers of parts of the walking robot.

3. The walking robot according to claim 1, wherein the communication protocol includes:
    a header representing a type of an address or a packet;
    a datagram which is data to be transmitted to the master or the plurality of slaves; and
    a checksum to confirm whether or not the communication error has occurred.

4. The walking robot according to claim 1, wherein the communication direction of the main communication path and the communication direction of the subsidiary communication path are opposite to each other.

5. The walking robot according to claim 1, wherein the master generates an alarm upon judging that the communication error has occurred.

6. The walking robot according to claim 1, wherein the communication error includes a multiple communication path error or a single communication path error.

7. A control method of a walking robot which has a ring-structured main communication path, a ring-structured subsidiary communication path, a master of the walking robot generating a communication protocol having an access counter and transmitting the communication protocol through the main communication path and the subsidiary communication path, and a plurality of slaves of the walking robot communicably connected to the master through the main communication path and the subsidiary communication path, the control method comprising:
    forming, by the plurality of slaves, loop-back paths connecting the main communication path and the subsidiary communication path when a communication error has occurred;
    increasing, by the plurality of slaves, a value of the access counter of the communication protocol received through the main communication path;
    decreasing, by the plurality of slaves, a value of the access counter of the communication protocol received through the subsidiary communication path; and
    judging, by the master, whether or not the communication error has occurred on the main communication path and the subsidiary communication path from the values of the access counter of the communication protocol having passed through the plurality of slaves.

8. The control method according to claim 7, wherein the communication error includes a multiple communication path error or a single communication path error.

9. The control method according to claim 8, wherein it is judged that the multiple communication path error has occurred, if the sum of the value of the access counter of the communication protocol received through the main communication path and the value of the access counter of the communication protocol received through the subsidiary communication path does not coincide with the number of the plurality of slaves.

10. The control method according to claim 8, wherein it is judged that the single communication path error has occurred, if the sum of the value of the access counter of the communication protocol received through the main communication path and the value of the access counter of the communication protocol received through the subsidiary communication path coincides with the number of the plurality of slaves.

11. The control method according to claim 8, further comprising generating an alarm, if the multiple communication path error or the single communication path error has occurred.

12. The control method according to claim 7, wherein:
    the master is a central computer of the walking robot; and
    the plurality of slaves is a plurality of motor controllers of parts of the walking robot.

13. The control method according to claim 7, wherein the communication protocol includes:
    a header representing a type of an address or a packet;
    a datagram which is data to be transmitted to the at least one master or the plurality of slaves; and
    a checksum to confirm whether or not the communication error has occurred.

14. The control method according to claim 7, wherein the communication direction of the main communication path and the communication direction of the subsidiary communication path are opposite to each other.

15. The control method according to claim 7, further comprising:
    generating, by the master, an alarm upon judging that the communication error has occurred.

16. A walking robot comprising:
    a ring-structured main communication path;
    a ring-structured subsidiary communication path;
    a computer controlling operations of the walking robot, the computer generating a communication protocol having an access counter and transmitting the communication protocol through the main communication path and the subsidiary communication path; and motor controllers of the walking robot, the motor controllers communicably connected to the computer through the main communication path and the subsidiary communication path, wherein each motor controller increases a value of the access counter of the communication protocol received by the respective motor controller through the main communication path, decreases a value of the access counter of the communication protocol received by the respective motor controller through the subsidiary communication path, and forms a loop-back path connecting the main communication path and the subsidiary communication path when a communication error has occurred between the respective motor controller and an adjacent motor controller, and the computer judges whether or not a single communication error or multiple communication errors occurred from the values of the access counter of the communication protocol having passed through the motor controllers.

* * * * *